UNITED STATES PATENT OFFICE.

WILHELM PICKHARDT, OF NEW YORK, AND HERMANN ENDEMANN, OF BROOKLYN, ASSIGNORS TO SAID PICKHARDT AND ADOLF KUTTROFF, OF NEW YORK, N. Y.

SALICYLATE OF CHINOLINE.

SPECIFICATION forming part of Letters Patent No. 256,444, dated April 11, 1882.

Application filed February 24, 1882. (Specimens.)

*To all whom it may concern:*

Be it known that we, WILHELM PICKHARDT and HERMANN ENDEMANN, both citizens of the United States, WILHELM PICKHARDT residing at New York, in the county and State of New York, and HERMANN ENDEMANN, residing at Brooklyn, in the county of Kings and State of New York, have invented new and useful Improvements in a Medical Compound, of which the following is a specification.

This invention relates to a medical compound which is obtained by the action of salicylic acid on chinoline.

In carrying out our invention we take by preference the chinoline of Skraup; or we prepare such chinoline according to the patent, No. 241,738, granted to Zdenko H. Skraup May 17, 1881, and then we free the same from the impurities mixed therewith by treating it with tartaric acid, whereby a tartrate of chinoline is obtained, and then we liberate from this salt the chinoline by treating its aqueous solution with caustic alkalies. If desired, however, chinoline prepared in any other manner may be used for our purpose.

For preparing our new compound we take about twenty-six parts of chinoline and mix the same with about twenty-six parts of strong alcohol. The mixture is then slightly heated while twenty-eight parts of the salicylic acid are added, the heating being continued until a clear solution is obtained. On cooling the acid salicylate of chinoline crystallizes. For further purification the mass is crushed in a mortar, then brought upon a filter, and washed with cold alcohol. The salt in its pure state is white; but frequently it appears slightly colored with a reddish tint from minute impurities contained in the salicylic acid.

Our salicylate of chinoline is easily soluble in warm alcohol, but much less in cold alcohol. Water acts in the same manner. Caustic alkalies added to the aqueous solution produce at first milky turbidity, which after some time subsides, and the chinoline, being thus liberated, collects in oily drops either at the bottom or surface of the liquid, which depends upon the specific gravity of the water solution. This solution contains the salicylate of the alkali used, the presence of which may be proved in the usual manner.

Our compound may be used with advantage for medical purposes.

What we claim as new, and desire to secure by Letters Patent, is—

As a new article of manufacture, the salicylate of chinoline herein described, and having the characteristics above set forth.

In testimony whereof we have hereunto set our hands and seals in the presence of two subscribing witnesses.

WM. PICKHARDT. [L. S.]
HERMANN ENDEMANN. [L. S.]

Witnesses:
W. HAUFF,
E. F. KASTENHUBER.